United States Patent [19]

Martorano et al.

[11] 4,087,397

[45] May 2, 1978

[54] AQUEOUS COATING COMPOSITIONS COMPRISING ACRYLIC OLIGOMERS AND HIGH MOLECULAR WEIGHT POLYMERS

[75] Inventors: Richard Martorano, Marlton, N.J.; William H. Brendley, Jr., Hatboro, Pa.

[73] Assignee: Rohm and Haas Company, Philadelphia, Pa.

[21] Appl. No.: 656,928

[22] Filed: Feb. 10, 1976

[51] Int. Cl.$^2$ .............................................. C08L 33/04
[52] U.S. Cl. ................... 260/29.6 WB; 260/29.6 TA; 260/901
[58] Field of Search .............. 260/29.6 WB, 29.6 TA, 260/901

[56] References Cited

U.S. PATENT DOCUMENTS

| 3,356,627 | 12/1967 | Scott | 260/29.6 TA |
|---|---|---|---|
| 3,705,124 | 12/1972 | Selby et al. | 260/29.6 TA |
| 3,935,151 | 1/1976 | Nickerson et al. | 260/29.6 TA |

*Primary Examiner*—M. J. Welsh

[57] ABSTRACT

This invention discloses a polymer composition for the coating of substrates, comprising an aqueous alkaline blend having a binder consisting essentially of two components. Component A) is an addition copolymer of (1) about 3% to about 30% by weight of an olefinically unsaturated monomer containing a carboxyl group or mixture thereof, (2) at least one ester of acrylic or methacrylic acid, and, optionally, (3) other olefinically unsaturated monomers, the total of (1), (2) and (3) being 100%. The weight average molecular weight of the copolymer is between 10,000 and 500,000, and it is in the form of a solution or a colloidal solution in an aqueous phase. Component B) is an oligomeric addition copolymer of (1) at least one ester of acrylic or methacrylic acid, (2) 9% to about 50% of an olefinically unsaturated monomer having at least one carboxyl group, and, optionally, (3) other olefinically unsaturated monomers, the total of (1), (2) and (3) being 100%. The weight average molecular weight of this copolymer is between 400 and 6,000, and the molecular weight distribution is such that the heterogeneity index is 3 or less. In the blend, on a solids basis, (A) is from 90 to 10 percent and (B) being from 10 to 90 percent by weight. Coatings employing these compositions are particularly useful as lubricants between metal working tools and the metal being worked.

14 Claims, No Drawings

AQUEOUS COATING COMPOSITIONS COMPRISING ACRYLIC OLIGOMERS AND HIGH MOLECULAR WEIGHT POLYMERS

CROSS-REFERENCE TO RELATED APPLICATION

This application claims subject matter disclosed in a pending application, for an invention by the same inventors, identified by the U.S. Ser. No. 587,775 filed on June 17, 1975.

This invention concerns coating compositions which are applied from aqueous media to the surfaces to be coated and are particularly useful in high-speed direct roll coating operations, as in metal coating. Lower-speed direct and reverse roll coating and other means for applying coatings may also employ these compositions. The coating compositions are excellent in flow, leveling and transfer from rolls to substrates.

One important use of these compositions is as lubricant coatings, particularly for steel. Lubricant coatings are alkali-removable coatings for metals, such as copper, brass, aluminum, magnesium and various grades and types of steel including stainless steel, which serve to improve the fabrication of the metal and serve to protect it from corrosion and other disfigurement. Direct roll coating is the preferred method of applying the lubricant coating, but other methods of application, for example, reverse roll coating, wipe or knife coating, dipping and electrodepositing, are also used. A second use for these compositions is as a thermoplastic air-drying lacquer, to be applied by spray, dip, flow coating or other means either as a pigmented or unpigmented coat, applicable to almost any hard surface. When pigmented, these compositions are useful as base coats for hard board or tile board, and when formulated to high pigment volume concentration, as a sanding sealer for these boards. With corrosion-inhibiting pigments, they are excellent air-dry primers for steel and other metals.

Metal stock is shaped and prepared for shipping to a fabricator by being subjected to a rolling operation wherein it is passed through a rolling mill to press it into the desired form. In this operation, a lubricant is needed between the rollers and the metal workpiece to reduce the friction and minimize the energy required in deforming the metal. The cold rolling of metals causes the skin temperature of the metal surface in contact with the rolls to rise as high as 100° to 200° C. even though no external heat is applied. Desirable features of a lubricant coating are high film strength, lubricity, corrosion resistance, non-staining and removability.

The lubrication, flow and protective aspects of the coating provide a set of diverse and difficult-to-meet characteristics for a suitable coating. The coating must protect the metal against marring, rusting and scarring during handling, shipping and storage, and yet be readily removable; it must have suitable lubricity and coefficient of friction to enable the metal to be fabricated in complicated metal feeding, rolling, cutting, etc. machines. The coatings of this invention are readily formulated to meet exacting conditions which may vary from machine to machine or from plant to plant to meet the different requirements of the fabricators. Indeed, simple modification of the coating, after it has been applied, to change its friction and lubricity properties is readily done with aqueous solutions. Basic aqueous systems can also be used to completely strip the coating from the metal. One of the current lubricant coatings is a two-coat system employing a resinous coating and a so-called triggering oil or resin activator. Combinations of this type are described in U.S. Pat. No. 3,568,486 which discloses polyacrylates as being among the useful resins for the system.

Compositions of the subject invention used as lubricant coatings have among their advantages ease of application by means of a high-speed roll coater and elimination of the necessity for triggering oil. The compositions of this invention are also good temporary coatings for metals such as iron and steel, brass, aluminum and galvanized steel. Hard board coating is another area where these compositions are of great utility. Hard board sanding often requires that a sealer coat be applied before the sanding operation because some hard board has a tendency to fuzz under the cut of the abrasives. These compositions pigmented at a high pigment volume concentration serve as excellent sanding sealers. They also serve as base coats for hard board or tile board applications when pigmented in the more normal range. Pigmented coatings can also be made which are useful on metals, particularly when the pigment is a corrosion-inhibiting pigment, in which case excellent air-dried primers for metals are produced.

Coatings made from the compositions of this invention exhibit a number of other useful properties, some of which are quite specialized, when tailored to a given end-use. The coated metal sheet may be stacked or stored for various time periods, sometimes at moderately elevated temperature. It is essential that the coatings not stick to each other in the case of face to face storage situations nor stick to the metal in face to back storage. It is advantageous to have a coating composition which can be applied from an aqueous medium to avoid air pollution, fire hazard and other problems which may arise with organic solvent containing systems. Direct roll coating at high speed is economically very advantageous, but its use introduces a number of other restrictions on the coating composition. Such systems often tend to dry on the roller, cause difficulties in cleanup or blister when force-dried, or in the case of final finishes, are deficient in properties such as humidity resistance, durability and hardness. Characteristically, water-based systems have been very difficult to formulate so as to obtain the rheological properties suitable for high-speed direct roll coating. This invention discloses compositions which overcome these obstacles.

It is frequently observed that ripples in the form of standing waves arise in the coating composition layer on roll coater rolls. These ripples often result in a pattern being transferred to the substrate, resulting in lack of surface smoothness or so-called "internal flow" lines in the coating on the substrate. Those skilled in the art recognize that an interplay of composition-dependent forces, such as surface tension, wetting of the rolls and substrate, and flow under high shear forces during application and low shear forces during leveling after application, play a role in achieving well-coated, attractive finished products. The flow of coating under these conditions is likely to entail elastic phenomena and time-dependent phenomena which are not well understood. For practical use, a composition is required which possesses flow and leveling properties such that when applied by a direct roll coater, it will form a uniform and smooth surface which is free of striations. The deficiency of aqueous emulsions from the standpoint of flow and leveling is well-recognized in the metal coating industry; see *Paint and Varnish Production,* February 1964, pages 28–33. The flow and leveling of pigmented base coats is most critical since pigmentation noticeably reduces flow in aqueous systems.

Other binder systems such as water-reducible polyesters, acrylics and alkyds are difficult to formulate with acceptable flow and leveling and, simultaneously, conform with the County of Los Angeles, California Rule 66 - solvent limitations, i.e., less than 20% by volume of exempt organic solvent. With these binders, there is also encountered storage stability problems due to hydrolysis of the binder. Colloidal dispersion polymers, colloidal solution polymers and polymer emulsions often exhibit poor flow and rapid drying on the rolls. It is difficult to control the rheology of the systems, often limiting their usage to slow-speed roll coating lines. The present invention overcomes these objections and, indeed, it is comparatively easy to formulate into paints, either clear or pigmented, with excellent properties and amenable to application by high-speed direct roll coating.

In lubricating oil technology, it is well-known that marked improvements in rheological properties are obtained by blending high molecular weight materials with low molecular weight materials. In the absence of any theoretical construct or explanation for the factors involved in coating transfer from the rolls and in flow and leveling, it is difficult to say whether an analogy exists between these lubricating oil systems and the current invention. In any case, it is clear that the blend of high molecular weight and low molecular weight binder components of the present invention also produces an exceptional and unexpected jump in desirable rheological properties. One may speculate that the critical stage for leveling occurs when most of the volatile components have left the film and the leveling is controlled by the amount of flow of the binder system before complete drying has taken place and that this flow is markedly dependent on the molecular weight distribution of the binder.

The compositions of this invention are pigmented and unpigmented compositions adapted for roller coating of substrates, comprising a stable aqueous alkaline blend having a binder consisting essentially of:

(A) an addition copolymer of (1) about 3% to about 30% by weight of an olefinically unsaturated monomer containing a carboxyl group, (2) at least one ester of acrylic and/or methacrylic acid, and, optionally, (3) other olefinically unsaturated monomers, the total of (1), (2) and (3) being 100%, the weight average molecular weight of the copolymer being between 10,000 and 500,000, in the form of a solution or a colloidal solution in an aqueous phase; and (B) an oligomeric addition copolymer of (1) at least one ester of acrylic or methacrylic acid, (2) about 9% to about 50% of an olefinically unsaturated monomer having at least one carboxyl group, and, optionally, (3) other olefinically unsaturated monomers, the total of (1), (2) and (3) being 100%, the weight average molecular weight of the copolymer being between about 400 and about 6000, the molecular weight distribution being such that the heterogeneity index is 3.0 or less. On a solids basis, the blended binder contains from 90% (A) and 10% (B) to 10% (A) and 90% (B) by weight. Preferably, the blend has a volatile aqueous phase comprising 70 to 95% by volume water and 5 to 30% by volume volatile organic solvents. The coating composition is preferably between 15 and 70% solids by weight, has a viscosity between 25 and 150 seconds as measured in a Number 4 Ford cup at 25° C. and is at a pH between about 8.0 and about 9.8. In each (A) and (B), the esters of acrylic or methacrylic acid are preferably at least 10% and, more preferably, at least 50% of the weight of the copolymer. It is preferred that component (A) be present as a salt of a volatile amine or ammonia.

Stated succinctly, the binder of this invention comprises two components: (A) a high molecular weight addition copolymer containing carboxyl groups and acrylate and/or methacrylate mers in the form of a solution or a colloidal solution in an aqueous phase, and (B) an acid-containing oligomer of narrow molecular weight distribution containing acrylate and/or methacrylate mers in the aqueous phase. The coating composition is stable and has the difficult-to-achieve requisite rheological properties for application by high-speed direct roll coating. The dry coating exhibits high gloss, corrosion resistance, mar resistance, warm stacking resistance, resistance to degradation, and when used as a metal lubricant requires no activator or triggering oil to achieve the proper lubricity and coefficient of friction.

High Molecular Weight Component

The high molecular weight copolymer component (A) is a solution or colloidal solution of a salt, normally of a volatile amine or ammonia, prepared from copolymers containing from about 3% to about 30% by weight of an addition polymerizable ethylenically unsaturated carboxylic acid, particularly selected from acrylic acid, methacrylic acid and itaconic acid, at least one ester of such addition polymerizable acid, especially acrylic and/or methacrylic acid, and, optionally, other olefinically unsaturated monomers. The salt is formed by addition of the amine or ammonia to the polymer in an aqueous medium which may also contain a cosolvent as hereinafter defined. In some instances, a limited amount of permanent base, up to one-fourth of the amine or ammonia level, may be used in forming the salt. The salts obtained often appear to form colloidal aggregates or micelles when in aqueous solution. Thus, a typical salt obtained in accordance with the present invention has been found to form micelles of about 500 Angstroms diameter (as determined from light-scattering and sedimentation measurements) when dissolved in water. The solutions of the copolymer salts are thus appropriately termed "colloidal solutions." The number average molecular weight of this component, as measured by calibrated gel permeation chromatography, is 10,000 to 500,000, with the range from 20,000 to 75,000 being preferred.

The colloidal nature of the dissolved polymer in a colloidal solution is indicated clearly by determination of the self-crowding constant, K, for the polymer in the solution as taught by A. Mercurio; see W. H. Brendley, Jr. and T. H. Haag in "Nonpolluting Coatings and Coating Processes," J. L. Gardon and J. W. Prane, eds., Plenum Press (1973) page 10ff. (these authors use the term "colloidal dispersion" for our "colloidal solution"). Spheres suspended in a liquid change the viscosity of the liquid as given by the Mooney equation:

$$\ln_{\eta rel} = 2.5\ \phi/(1-K\ \phi)$$

where
$\ln$ = natural logarithm;

$\eta$rel = viscosity of the system divided by that of the pure liquid;

$\phi$ = volume fraction of spheres; and $K$ = the self-crowding constant.

Mercurio rearranged the Mooney equation to:

$$1/\ln_{\eta rel} = 1/BC - K/2.5$$

where the new symbols are:

B = an experimental constant, and

C = the concentration of polymer in the liquid;

and evaluated K by extrapolating plots of $(1/\ln_{\eta rel})$ vs. $(1/C)$ to the intercept where $(1/C) = 0$. This led to the finding that dispersions of spheres, such as polymer emulsions, have values of K in the neighborhood of 1.9, colloidal solutions about 1.0, and simple solutions about zero. Thus, a self-crowding constant of about 1.0 serves as another way of characterizing the colloidal solutions.

The esters of acrylic or methacrylic acid used in preparing the copolymer of component (A) may be represented by

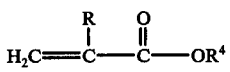

wherein R is H or methyl; and $R^4$ is an alkyl group, preferably having 1 to 24 carbon atoms, more preferably 1 to 12 and most preferably 1 to 4 carbon atoms, an alkenyl group, preferably having 2 to 4 carbon atoms, an aminoalkyl group, preferably having 2 to 8 carbon atoms, an alkylaminoalkyl group, preferably having up to 6 carbon atoms, a dialkylaminoalkyl group, preferably having up to 6 carbon atoms, an isocyanatoalkyl group, preferably having 2 to 8 carbon atoms in the alkyl portion, a hydroxyalkyl group, preferably having 2 to 8 carbon atoms, a 3-(1,3-oxazolidinyl)alkyl group, preferably having 2 to 4 carbon atoms in the alkyl portion and optionally having up to two $(C_1-C_4)$alkyl substituents on the oxazolidinyl ring, an allyloxyalkyl group, preferably having up to 12 carbon atoms, an alkoxyalkyl group, preferably having up to 12 carbon atoms, an aryloxyalkyl or aralkoxyalkyl group, preferably having up to 12 carbon atoms, most preferably a phenoxyalkyl, benzyloxyalkyl, substituted phenoxyalkyl, or substituted benzyloxyalkyl group, an aralkyl group, preferably having up to 10 carbon atoms, most preferably a benzyl or substituted benzyl group, or an acryloyloxyalkyl or methacryloyloxyalkyl group, preferably having up to 4 carbon atoms in the alkyl portion, a group of the formula $-A^1N(R^3)CXNR^1R^2$;

wherein $R^3$ is selected from the group consisting of H, alkyl groups having 1 to 4 carbon atoms, hydroxyalkyl groups having 1 to 4 carbon atoms, and alkoxymethyl groups having 2 to 5 carbon atoms;

$A^1$ is an alkylene group having 2 to 8 carbon atoms;

$R^1$, when not directly attached to $R^2$, is H, phenyl, methylbenzyl, benzyl, cyclohexyl, alkyl having 1 to 6 carbon atoms, hydroxyalkyl having 1 to 6 carbon atoms or N-alkoxyalkyl having 2 to 6 carbon atoms;

$R^2$, when not directly attached to $R^1$, is H, phenyl, methylbenzyl, benzyl, cyclohexyl or alkyl having 1 to 6 carbon atoms;

$R^1$ and $R^2$, when directly connected together, is the morpholino residue $-C_2H_4OC_2H_4-$, the piperidino residue $-(CH_2)_5-$, or the pyrrolidino residue $-(CH_2)_4-$; and X is selected from the group consisting of oxygen and sulfur, or a cyclic ureido group of the formula:

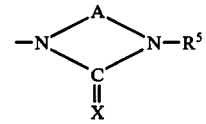

wherein A is an alkylene group having 2 to 3 carbon atoms;

$R^5$ is selected from the group consisting of H, $-CH_2OH$ and $-CH_2OCH_3$; and X is selected from the group consisting of oxygen and sulfur.

Examples of these acrylic and methacrylic ester monomers are: methyl methacrylate, ethyl methacrylate, n-butyl methacrylate, isobutyl methacrylate, t-butyl methacrylate, hexyl methacrylates, lauryl methacrylate, stearyl methacrylate, cyclohexyl methacrylate, dimethylaminoethyl methacrylate, t-butylaminoethyl methacrylate, 2-hydroxyethyl methacrylate, n-propoxyethyl methacrylate, 2-hydroxypropyl methacrylate, oxazolidinylethyl methacrylate, allyloxyethyl methacrylate, allyl methacrylate, allyloxyethoxyethyl methacrylate, isopropyloxazolidinylethyl methacrylate, isopropylidene glyceryl methacrylate, γ-ketiminopropyl methacrylate, methyl acrylate, ethyl acrylate, propyl, isopropyl and cyclopropyl acrylates, isobutyl, t-butyl, butyl and cyclobutyl acrylates, pentyl and cyclopentyl acrylates, hexyl and cyclohexyl acrylates, heptyl and cycloheptyl acrylates, octyl acrylates, including 2-ethylhexyl acrylate, nonyl acrylates, decyl acrylates, undecyl acrylates, lauryl acrylate, myristyl acrylate, cetyl acrylate, stearyl acrylate, phenylethyl acrylate, phenylpropyl acrylates, allyl acrylate, dimethylaminoethyl acrylates, t-butylaminoethyl acrylate, dimethylaminobutyl acrylates, diethylaminoethyl acrylate, morpholinoalkyl acrylates, oxazolidinylalkyl acrylates, piperidinoalkyl acrylates, ketiminoalkyl acrylates, methoxyethyl acrylate, ethoxyethyl acrylate, butoxyethyl acrylates, hexyloxypropyl acrylates, ethoxypropyl acrylates, propoxybutyl acrylates, hexyloxyhexyl acrylates, phenoxyethyl acrylates, benzyloxyethyl acrylates, allyloxyethyl acrylate, allyloxyethoxyethyl acrylate, allyloxypropyl acrylate, β-thioureidoethyl methacrylate, N-methyl-N'-β-methacryloxyethyl-urea, N-(β-methacryloxypropyl)-N-methylol-N,N'-propyleneurea, β-ureidoethyl acrylate, N-methylol-N'-methylol-N'-β-acryloxyethylurea, N-(β-acryloxyethyl)-N,N'-ethyleneurea, N-(β-acryloxyethyl)-N-methoxymethyl-N,N'-ethyleneurea, N-(β-acryloxyethyl)-N-methylol-N,N'-ethylenethiourea, N-(3-acryloxypropyl)-N,N'-trimethyleneurea, N-[β-(α-acryloxyacetamide)ethyl]-N,N'-ethyleneurea, N-[β-(β-acryloxyacetamido)ethyl]-N-methylol-N,N'-ethyleneurea, N-[β-(α-methacryloxyacetamido)ethyl]-N,N'-ethyleneurea, N-[β-(α-methacryloxyacetamido)ethyl]-N-methylol-N,N'-ethylenethiourea, N-[β-(α-methacryloxyacetamido)propyl]-N,N'-propyleneurea, N-[β-(α-acryloxyacetamido)propyl]-N,N'-trimethyleneurea, and N-[β-(α-methacryloxyacetamido)ethyl]-N-methylol-N,N'-ethyleneurea.

The preferred esters are the $C_1$ to $C_{12}$ alkyl esters, preferably $C_1$ to $C_8$, with the lower ones, $C_1$ to $C_4$, being most preferred.

Examples of the olefinically unsaturated monomers containing a carboxyl group used in the copolymer of component (A) are: sorbic, cinnamic, vinyl furoic, α-chlorosorbic, p-vinylbenzoic, acrylic, methacrylic, maleic, fumaric, aconitic, atropic, crotonic and itaconic acids, or mixtures thereof, with itaconic acid and the α,β-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate and butyl acid maleate.

Other olefinically unsaturated monomers used in the copolymer of component (A) are monomers comprising at least one of the following groups:

| | |
|---|---|
| vinylidene | $CH_2=C<$, |
| vinyl | $CH_2=CH-$, and |
| vinylene | $-CH=CH-$. |

Examples are the α,β-ethylenically unsaturated monocarboxylic acid amides, such as those of the formula:

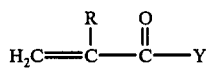

wherein R is H or methyl; and

Y is an amino, a $(C_1-C_4)$alkylamino, a di$(C_1-C_4)$alkylamino, a hydroxy$(C_1-C_4)$alkylamino, a bishydroxy$(C_1-C_4)$alkylamino, a $(C_1-C_4)$alkoxy$(C_1-C_4)$alkylamino or a bis-$(C_1-C_4)$alkoxy$(C_1-C_4)$alkylamino;

α,β-ethylenically unsaturated aldehydes, α,β-ethylenically unsaturated dicarboxylic acid esters, amides, half esters and half amides thereof, α,β-ethylenically unsaturated nitriles, hydrocarbons such as vinylaryl compounds, vinyl halides, vinyl acyloxy compounds (esters of saturated carboxylic acids and ethylenically unsaturated alkanols), vinyl amines and salts thereof, vinyl ureido monomers, vinyl compounds having heterocyclic nitrogen-containing (HN<) groups, and halogen, hydroxyalkyl or aminoalkyl substituted derivatives thereof, whether homopolymers or copolymers.

Specific examples of olefinically unsaturated monomers which may be used in component (A) according to the invention are: acrolein, methacrolein, acrylonitrile, ethylene, propylene, isobutene, butadiene, isoprene, chloroprene, styrene, α-methyl styrene, vinyl toluene, vinyl pyrrolidone, vinylidene chloride, vinyl chloride, vinyl bromide, vinyl acetate, vinyl propionate, the vinyl pyridines, amino compounds such as β-aminoethyl vinyl ether, aminopentyl vinyl ether, ureido monomers such as β-(N,N'-ethyleneureido)ethyl acid maleate, β-ureidoethyl vinyl ether, N-vinyl-N,N'-ethyleneurea, N-vinyloxyethyl-N,N'-ethyleneurea, N-dimethylaminoethyl-N'-vinyl-N,N'-ethyleneurea, N-hydroxyethylacrylamide, N-methylolacrylamide and N-(dimethylaminoethyl)acrylamide. Of these, the vinyl aromatic monomers, especially styrene, α-methyl styrene and vinyl toluene, are preferred.

Oligomer Component

The oligomeric copolymer of component (B) may be prepared by any of several known methods. The preferred preparations are by anionic polymerization initiated by an alkoxide ion catalyst and in the presence of a chain-regulating alcohol for certain classes of monomers. These preparations are taught in U.S. patent applications Ser. No. 517,337 filed Oct. 23, 1974, Ser. No. 371,921 filed June 20, 1973 and now abandoned and Ser. No. 629,186 filed Nov. 5, 1975, a continuation-in-part of Ser. No. 241,177 filed Apr. 5, 1972, now abandoned, all of Sheldon N. Lewis et al, having the same assignee as the present application, the disclosures of which are incorporated herein by reference.

Other known methods of producing low molecular weight polymers may be utilized, such as the use of a high proportion of a free radical catalyst, the use of a high polymerization temperature, the use of a chain transfer agent, or all of these together. Among the chain transfer agents are carbon tetrabromide, allyl chloride, thio-β-naphthol, thiophenol, butylmercaptan, ethylthioglycolate, mercaptoethanol, isopropylmercaptan, and t-butylmercaptan. When free radical catalysts are utilized, the concentration can be increased to a point where the molecular weight is reduced substantially, particularly with high reaction temperatures. For example, utilizing benzoyl peroxide or di-t-butyl peroxide in amounts of from 0.5 mole percent to 5 mole percent based on monomer, along with a solvent such as isopropyl benzene, and utilizing reaction temperatures of 110° to 250° C. gives low molecular weight polymers. The polymerization processes can be solution, bulk, emulsion, or a nonaqueous dispersion. In addition to the anionic polymerization and free radical polymerization processes, cationic polymerization may be conducted at high temperatures or in the presence of high levels of initiators or chain transfer agents. Degradative processes may be used to produce the oligomers from high polymers such as by mastication, photochemically-induced degradation, oxidation, and bombardment with high energy radiation such as x-rays, gamma rays and high energy electrons. In cases where the products have a wide molecular weight distribution, it may be necessary to obtain the preferred narrow molecular weight distribution, corresponding to a ratio of weight average to number average molecular weight of 1.5 or less, by vacuum distillation, zone refining, selective precipitation, selective crystallization, solvent extraction, or other known methods. It is, of course, much preferred to use a process which initially gives the narrow distribution of molecular weights such as illustrated in the Lewis et al patent applications noted above.

Most of the monomers useful for the preparation of the oligomers of component (B) are the same as those discussed above for the preparation of the higher molecular weight copolymers of component (A). The acid groups in the copolymer are either introduced by means of acid monomers or produced by hydrolysis of ester units in the oligomer, the latter is the method of preference.

Component (B) comprises (1) about 50 to 91%, by weight, of mer units derivable from one or more monomers preferably selected from styrene, α-methyl styrene, acrylonitrile, vinyl chloride, vinyl acetate, vinyl pyrrolidone, vinylidene chloride, and monomers of the formula:

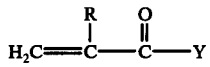

wherein R is H or methyl; and

Y is an amino, a $(C_1-C_4)$alkylamino, a di$(C_1-C_4)$alkylamino, a hydroxy$(C_1-C_4)$alkylamino, a bis-hydroxy$(C_1-C_4)$alkylamino, a $(C_1-C_4)$alkoxy$(C_1-C_4)$alkylamino, a bis-$(C_1-C_4)$alkoxy$(C_1-C_4)$alkylamino, or a group of the formula $-OR^4$;

wherein $R^4$ is a $(C_1-C_{24})$alkyl, preferably $(C_1-C_8)$alkyl, a $(C_2-C_4)$alkenyl, a $(C_1-C_8)$aminoalkyl, an alkylaminoalkyl having up to 6 carbon atoms, a dialkylaminoalkyl having up to 6 carbon atoms, a group of the formula $-A^1N(R^3)CXNR^1R^2$, a $(C_2-C_8)$isocyanatoalkyl, a $(C_2-C_8)$hydroxyalkyl, a 1,3-oxazolidin-3-yl-$(C_2-C_4)$alkyl, optionally having up to two $(C_1-C_4)$alkyl substituents on the oxazolidinyl ring, an allyloxyalkyl having up to 12 carbon atoms, an alkoxyalkyl having up to 12 carbon atoms, an aryloxyalkyl or aralkyloxy having up to 12 carbon atoms, an aralkyl having up to 10 carbon atoms, an acryloyloxy$(C_1-C_4)$alkyl, a methacryloyloxy$(C_1-C_4)$alkyl, or a cyclic ureido group of the formula:

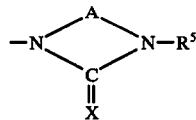

wherein $R^3$ is selected from the group consisting of H, alkyl having 1 to 4 carbon atoms, hydroxyalkyl having 1 to 4 carbon atoms, and alkoxymethyl having 2 to 5 carbon atoms;

$A^1$ is an alkylene having 2 to 8 carbon atoms;

$R^1$, when not directly attached to $R^2$, is H, phenyl, methylbenzyl, benzyl, cyclohexyl, alkyl having 1 to 6 carbon atoms, hydroxyalkyl having 1 to 6 carbon atoms, or N-alkoxyalkyl having 2 to 6 carbon atoms;

$R^2$, when not directly attached to $R^1$, is H, phenyl, methylbenzyl, benzyl, cyclohexyl or alkyl having 1 to 6 carbon atoms;

$R^1$ and $R^2$, when directly connected together, is the morpholino residue $-C_2H_4OC_2H_4-$, the piperidino residue $-(CH_2)_5--$, or the pyrrolidino residue $-(CH_2)_4-$;

X is selected from the group consisting of oxygen and sulfur;

A is an alkylene having 2 to 3 carbon atoms; and $R^5$ is selected from the group consisting of H, $-CH_2OH$ and $-CH_2OCH_3$;

and (2) 9% to about 50% of carboxylic acid mer units derivable from the monomers acrylic acid, methacrylic acid or itaconic acid. In both (1) and (2), the mer units are derivable from the given monomers by addition polymerization. However, the polymers need not be made from the monomers. Indeed, in a preferred embodiment of this invention, the acid mer units are made by hydrolysis of ester mer units in the polymer.

In a more preferred embodiment, component (B) is a copolymer of esters or amides of acrylic acid or methacrylic acid, or mixtures of these with each other or with other vinyl monomers.

The weight average molecular weight, measured by calibrated gel permeation chromatography, of the oligomer component is 400 to 6000, with the range 500 to 2500 being preferred. The heterogeneity index, the ratio of the weight average molecular weight to the number average molecular weight, is three or less, with the low range, corresponding to less than 1.5, being particularly preferred. Also preferred is a weight distribution so narrow that 80% by weight of the oligomer molecules have molecular weight in the range from about $\bar{n}/3$ to about 3.3 $n$, where $\bar{n}$ is the average number of mers in the polymer chain. Thus, when the average chain length of the homopolymer or copolymer is about 6 to 7 mers, at least about 80% by weight of the homopolymer or copolymer will generally have chain lengths of about 3 to 20 mers, and when the average chain length of the homopolymer or copolymer is about 17 to 18 mers, at least about 80% by weight of the homopolymer or copolymer will generally have chain lengths of about 6 to about 60 mers.

The coating compositions of the present invention may be employed as clears, i.e., nonpigmented clear top coatings, or as pigmented coatings. If pigmented, the ratio of pigments to coating solids may be varied widely, depending on the pigment employed and the specific application involved. Thus, the ratio of pigment to coating solids may vary from 1 to 20 to 20 to 1. As clear coatings, the compositions will usually be formulated between 15 and 60 percent solids by weight; pigmented formulations will be between 30 and 70 percent by weight.

The coatings are useful as protective coatings where the substrate is handled after being coated and the coating is then removed. The coating compositions of this invention are of particular utility for metal lubricants, especially where the substrate is a metal sheet which is mechanically shaped or rolled after the coating operation. Iron, steel, aluminum, copper, bronze or brass surfaces, particularly in sheet or coil form with thicknesses of 0.05 to 0.20 inches, prove to be excellent as substrates for the coating compositions of the present invention. Ceramic surfaces and the surfaces of boards comprising wood, including composite boards containing wood chips, wood sawdust or wood fibers, are also suitable as substrates. For roller coating a substrate with the composition of this invention, an amount to provide a final dry layer from 0.01 to 5 mils in thickness, preferably 0.2 to 1.5 mils in thickness, is used.

A wide variety of pigments can be employed with the coating compositions of the present invention. Typical pigments which are suitable include titanium dioxide, iron oxide, calcium carbonate, barytes and numerous types of clays.

The coating compositions of this invention are particularly suitable for application by a direct roll coater, although they may be applied by other means such as a reverse roll coater or a spray gun.

Certain monomers are known to contribute toughness to films. These include the mono-olefinically unsaturated aromatic monomers, acid monomers, monomers having hydroxyl and/or amide funtionality. The olefinically unsaturated monomer containing a carboxyl group may be a simple monocarboxylic acid, or it may be a half ester or half amide of an α,β-unsaturated dicarboxylic acid and salts thereof with a volatile base, such as ammonia, or volatile water-soluble amine, such as dimethylamine, dimethylethanolamine, triethylamine, triethanolamine, morpholine, n-methyl morpholine, picoline and the like. The coating composition described may be used as lubricant coatings, clear top coatings or may be pigmented with a variety of pigments. When the lubricant coatings of this invention are used as metal lubricant coatings, they do not require activators such as triggering oils or organic or aqueous solvent solutions of oils. In other coating applications, they may contain materials designated as coalescents, but these are generally not necessary in the compositions of this invention. Rheology modifiers may also be used with or as part of these compositions, but again they are generally unnecessary. It is well-known that the introduction of coalescents or rheology modifiers often results in the loss of or downgrading of certain of the desirable properties of coatings. It is one of the great advantages of the instant invention that these materials are rendered unnecessary. This produces considerable simplification for the formulator and improvement in the film properties by the elimination of materials which do not contribute to the binder but, generally, act as diluents in the binder component.

In formulating a coating of this invention, a wide range of compositions are found useful depending on the coating properties desired. For very fluid systems with Newtonian flow characteristics a high level, up to about 90 percent, of oligomer is chosen; for a high viscosity of non-Newtonian characteristics the oligomer level is low, as low as approximately 10 percent. Thus, the binder ranges from 90 percent oligomer, 10 percent high molecular weight colloidal solution polymer, both expressed as weight percent solids, to 10 percent oligomer, 90 percent colloidal solution polymer. A preferred range is 80 percent oligomer, 20 percent colloidal solution polymer to 30 percent oligomer, 70 percent colloidal solution polymer. The pH of the system is basic usually between 8.0 and 9.8, with the preferred range from 8.7 to 9.5. The pH adjustments are made by the addition of basic materials such as ammonia, dimethylaminoethanol, triethanolamine and morpholine to achieve both the desirable rheological properties and corrosion resistance desired. The viscosity of the system increases with increasing pH in the usual pH range until the pH of about 10. Over the same range, the corrosiveness on metals generally decreases. The volatiles in a coating composition are 70 to 95 percent water by volume, 5 to 30 percent organic solvents, the preferred range being 80 to 95 percent water and 5 to 20 percent organic solvents. In general, the higher the organic solvent content the higher the viscosity for a given binder. The number 4 Ford cup viscosity, American Society for Testing Materials, method D1200-58 of the finished coatings compositions is in the range 25 to 150 seconds, with 40 to 100 seconds being preferred. The solvents used are those generally recognized as "strong" solvents and include lower alcohols such as the propyl, butyl and pentyl alcohols, the ketones such as methyl ethyl ketone, the methyl butyl ketones, the methyl propyl ketones and lower alkoxy ethanol solvents such as the propyl ethoxy and butoxy ethanols.

Particularly useful compositions are pigmented or unpigmented compositions adapted for direct roller coating of substrates comprising a stable aqueous alkaline blend having a binder consisting essentially of: (A) an addition copolymer of (1) about 20% to about 50% by weight of styrene, methyl methacrylate or both, about 40% to about 60% butyl acrylate and about 10% to about 20% methacrylic acid, the weight average molecular weight of the copolymer being between 20,000 and 75,000; (B) a partially hydrolyzed alkoxide polymerized addition copolymer of methyl methacrylate and butyl methacrylate with an acid number being between 100 and 200, the weight average molecular weight being between 500 and 2500, the molecular weight distribution is such that the heterogeneity index is 1.5 or less; and in the blend, on a solids basis, (A) being from 70 to 20 percent and (B) being from 30 to 80 percent by weight, and the blend having a volatile aqueous phase comprising 70 to 95 percent by volume of water and 5 to 30 percent by volume of volatile organic solvents, the composition having between 15 and 70 percent solids by weight, with a viscosity between 25 and 150 seconds measured in a number 4 Ford cup at 25° C. and a pH between 8.7 and 9.5.

The following examples, in which the parts and percentages are by weight and viscosities are measured by the Brookfield Viscometer unless otherwise indicated, are illustrative of the invention but are not intended to limit it in any way.

Examples of the high molecular weight component (A) are:

EXAMPLE A1

(a) Preparation of Acidic Polymer in Solution

A monomer mixture is prepared by combining the following materials:

|  | Grams |
| --- | --- |
| Ethyl acrylate | 215 |
| Methyl methacrylate | 215 |
| β-Hydroxyethyl methacrylate | 55 |
| Methacrylic acid | 15 |
| 2-Ethoxyethanol | 108 |

To a glass reaction vessel equipped with a reflux condenser, a Teflon paddle, and a dropping funnel and thermometer, there is charged 1390 grams of 2-ethoxyethanol. The contents of the flask are heated to a temperature of 75° C. by means of a water bath, and 3.75 grams of azodiisobutytronitrile (AIBN) are added to the 2-ethoxyethanol immediately prior to the addition of one-quarter of the monomer mix, which amount is added over a period of about five minutes. With the batch temperature maintained at 75° ± 5° C. throughout, a second quarter of the monomer mix is added after 30 minutes; a third quarter after 60 minutes; and a fourth quarter after 90 minutes; with each addition requiring about five minutes. The batch temperature is maintained at 75° C. for an additional period of from three to fifteen hours, with 1.9 grams of AIBN added two hours after the start of the monomer addition and 0.85 grams of AIBN added two hours later. The batch is cooled and passed through cheese cloth to remove any insoluble residues. Conversion to polymer is given by a solids analysis, which indicates that polymer has been formed in conversions of 99% or better.

(b) Isolation of Solution Polymer

The 25% concentrate of polymer in 2-ethoxyethanol obtained from Example 1(a) is diluted to 12.5% (although the exact dilution is not critical) with 2-ethoxyethanol or methanol. A five-gallon bucket is about half filled with an equal mixture of water and ice, and the mixture is agitated. The polymer solution is slowly added to the agitated ice-water mixture. An immediate precipitate forms. About one gallon of the polymer solution can be precipitated in this way. The ice-water mix is allowed to warm to room temperature and the precipitated polymer removed by filtration through a Buchner funnel fitted with coarse filter paper. Two to four successive washings with cold water remove all traces of solvent. The polymer is air-dried.

(c) Solubilization of the Isolated Polymer

The polymer isolated as in (b) is solubilized in the following way. To a suitable digestion flask is charged the following:

|  | Grams |
| --- | --- |
| Polymer | 100 |
| Water | 400 |
| Tert-butanol | 25 |
| Dimethylaminoethanol (1.5 equivalents) | 4.6 |

This mixture is well mixed and digested at 70°–80° C. for a period of several hours. The resultant solution is clear.

EXAMPLE A2

(a) Preparation of the Acidic Polymer as an Aqueous Latex

A monomer mix is prepared from the following materials:

|  | Grams |
| --- | --- |
| Ethyl acrylate | 460 |
| Methyl methacrylate | 460 |
| β-Hydroxypropyl methacrylate | 50 |
| Methacrylic acid | 30 |
| $CBrCl_3$ | 2.5 |

To a glass reaction vessel equipped with reflux condenser, Teflon paddle, and an addition funnel and thermometer is charged:

|  | Grams |
| --- | --- |
| Water | 1708 |
| 10% aqueous solution of the dimethylamino-ethanol-solubilized polymer of Example A1 (c) | 200 |

The charge to the flask is heated to 95° C. by means of a steam bath, and the monomer mix is added uniformly over a period of 30 to 45 minutes while, simultaneously and proportionately, a solution of 1.88 grams of ammonium persulfate in 100 ml. of water is added from a burette. During the simultaneous addition of monomer mix and initiator solution, the batch temperature is maintained above 90° C., and agitation is maintained at a fairly rapid rate (i.e., 100–400 r.p.m.). Heating is continued for one-half hour after the monomer addition is complete, and the batch is then cooled to room temperature for storage, or to 50° C. if solubilization is to be carried out immediately. The polymer latex, 33% polymer, is a white, opaque, smooth product with a viscosity of 10 to 20 cps. It is very stable.

(b) Solubilization

Separate 90-gram portions of the final polymer latex of part (a) is solubilized by mixing the 90-gram amount of latex obtained in part (a) with 1.0 gram of dimethylaminoethanol in $x$ grams of a water:cosolvent blend of $(100-y):y$ weight ratio and maintaining the mixture at 55° C. for two hours, the cosolvent and $x$ and $y$ being in the respective instances:

|  | x | y |
| --- | --- | --- |
| 1. Tert-butanol | 125 | 6 |
| 2. n-Butanol | 125 | 3 |
| 3. Isopropanol | 50 | 20 |
| 4. Isophorone | 100 | 10 |
| 5. 2-ethylhexanol | 100 | 3 |
| 6. 2-(butoxy)ethyl acetate | 110 | 5 |
| 7. 2-(butoxyethoxy)ethyl acetate | 80 | 5 |
| 8. Triethanolamine | 100 | 3 |
| 9. 2-butoxyethanol | 50 | 6 |

EXAMPLE A3

Illustrative of another type of aqueous latex, a copolymer is prepared by the emulsion polymerization of a mixture of 50 parts butyl acrylate, 25 parts methyl methacrylate, 10 parts styrene and 15 parts methacrylic acid. The initiator system is 1.5% hydrogen peroxide, 0.75% hydroxylamine and 5 p.p.m. ferrous ion. The emulsifying agent is 0.5% sodium lauryl sulfate. The solids content of the latex is 35.0%, the emulsion has a viscosity of 120 cps. The copolymer has an intrinsic viscosity of 0.14 (in acetone at 30° C.) and a weight average molecular weight of 50,000. Solubilization is carried out as in Example A2 part (b).

EXAMPLE A4

A copolymer latex is prepared as in Example A2 utilizing the following monomer mix:

|  | Grams |
| --- | --- |
| Ethyl acrylate | 510 |
| Methyl methacrylate | 440 |
| Methacrylic acid | 50 |
| $CBrCl_3$ | 2.5 |

EXAMPLE A5

A copolymer latex is prepared as in Example A3 utilizing the following monomer mixture: 25 parts methyl methacrylate, 10 parts styrene, 35 parts butyl acrylate and 15 parts methacrylic acid.

The following are examples of the oligomeric polymer, component (B):

EXAMPLE B1

Step A — Oligomeric Methyl methacrylate/Butyl methacrylate (75/25 by weight)

To a three-liter, three-necked flask equipped with a condenser, paddle stirrer, thermometer, addition funnel and Y-tube is added, under nitrogen, toluene (60g), n-butanol (22.5 g), sodium methoxide in methanol (25% solution, 29.4 g) and potassium methoxide in methanol (30% solution, 12.7 g). To this clear solution at 60° C. is added, with stirring, methyl methacrylate (310 g) and butyl methacrylate (103 g) over a 30-minute period. The light yellow mixture is maintained at about 61° C. until the reaction mixture exotherms (about 35 minutes after addition). The temperature is maintained at about 65° C. After the exotherm subsides, there is then added over a one-hour period methyl methacrylate (1,067 g) butyl methacrylate (335 g) and toluene (414 g) while maintaining the reaction temperature at 60°–63° C. with ice bath cooling. The product obtained at over 98% conversion, after a ½-hour hold following the second stage addition, is oligomeric methyl methacrylate/butyl methacrylate (75/25) of $\overline{M}_w$ ca. 1450, $\overline{M}_n$ ca. 1300, thus a heterogeneity index of 1.1, measured by calibrated gel permeation chromatography, and is employed in the following step without further purification.

Step B — Oligomeric Methyl methacrylate/Butyl methacrylate Hydrolysis to 25% Methacrylic Acid To the oligomeric methyl methacrylate/butyl methacrylate of part A (1,000 g, 80.1% oligomer) in a three-liter, three-necked flask equipped with a bottom stopcock, reflux condenser, stirrer and thermometer, under a nitrogen atmosphere, at 63° C. is added aqueous sodium hydroxide (185 g, 50.3%). The reaction mixture is held at 73°–78° C. for one hour and then heated to reflux for 4.5 hours. Titration discloses 84% conversion at this point. The yellow viscous oil is cooled and diluted with water (200 g) and toluene (200 g). A heterogeneous distillate (400 g) is removed over a 1½ hour period. To the remaining clear yellow-orange solution is added toluene (200 g) and the mixture refluxed for 5½ hours. At this time, toluene (200 g), isobutanol (100 g) and water (710 g) are added and the reaction mixture cooled to 50°–60° C. Sulfuric acid (179 g, 97%) is added over 15 minutes with cooling. The reaction mixture becomes a white, mobile, two-phased mixture and is agitated an additional 15–20 minutes. After removing the aqueous layer, additional water (700 g) is added and the reaction mixture heated at 60°–70° C. with sufficient vacuum to remove the toluene. The pressure is adjusted to atmospheric pressure after collecting about 400 g of distillate while increasing the temperature to 100° C. To the remaining white, two-phased, soft-gum mixture at 90° C. is added dimethylaminoethanol (222 g) and butyl Cellosolve (464 g). After two-thirds of the dimethylaminoethanol (DMAE) is added, solubilization occurs. The solution is cooled to 60°–65° C. and the remaining DMAE added. The product solution is clear and pale yellow (APHA color ca. <250); solids are 60%; pH ca. 9.3; viscosity at 25° C. is ca. 4,000 cps and product acid number is ca. 160 (at 100% solids) indicating a copolymer containing 25% methacrylic acid units.

In general, the oligomeric polymer may be left in the acid form, neutralized with dimethylaminoethanol as in this example, or neutralized with some other base. Other such bases include ammonia and various amines commonly using in formulating water-based coatings and well-known to those skilled in this art.

To calculate the average molecular weights of the hydrolyzed polymer the final step is to obtain the average molecular weight (M.W.) of the mers in the unhydrolyzed copolymer. This is 0.75 × M.W. of methyl methacrylate plus 0.25 × M.W. of butyl methacrylate, in numbers, 0.75 × 100 + 0.25 × 142 = 110.5. Since methacrylic acid has a molecular weight of 86, hydrolysis of 25% of the acid units produces a new average molecular weight of about 0.25 × 86 + 0.75 × 110.5 = 104.5. To convert the $\overline{M}_w$ and $\overline{M}_n$ of the unhydrolyzed polymer to that of the hydrolyzed polymer these are multiplied by the ratio 104.5/110.5. Thus for the hydrolyzed polymer the $\overline{M}_w$ is ca. 1370 and $\overline{M}_n$ is ca. 1230.

EXAMPLE B2

Step A — Oligomeric Methyl methacrylate

To a two-liter, three-necked flask equipped with a stirrer, thermometer and reflux condenser are added, under a nitrogen blanket, toluene (115 g), methanol (2.4 g), 30% methanolic potassium methoxide (20.2 g) and methyl methacrylate (216 g). The temperature of the reaction mixture rises to 27° C. over a 25-minute period. The mixture is then warmed to 33° C. within 20 minutes, and within another 20 minutes, the temperature reaches 42° C. and required cooling. After 40 minutes, the reaction mixture is warmed to maintain the temperature at about 40° C. After 1½ hours, the reaction temperature is increased to 60° C., at which time a solution of methyl methacrylate (649 g) and toluene (265 g) is added while maintaining the temperature at 60°–62° C. After a 45-minute hold period, conversion exceeds 99%. An aliquot of the reaction mixture (300 g) is treated with concentrated sulfuric acid (1.05 g) and diatomaceous earth (1.5 g) and filtered to afford a clear, light yellow oil at 70.5% solids. Molecular weight determination by gel permeation chromatography discloses $\overline{M}_w$ 1700 and $\overline{M}_n$ 1350–1400, thus a 1.2 to 1.3 heterogeneity index.

Step B — Partially Hydrolyzed Oligomer of Methyl methacrylate

Oligomeric methyl methacrylate (1,200 g) in a two-liter Parr bomb fitted with a sampling tube, pressure gauge, stirrer shaft, pressure release valve and hose connection to a dry ice condenser is added aqueous sodium hydroxide (161 g, 50.9%). The bomb is heated by an oil bath at 130°–135° C. with the vent valve opened for one-half hour. The vent valve is then closed, and the temperature of the reaction mixture is adjusted to 110° C., the pressure is 14 psig. After two hours, the heating is discontinued and toluene (120 g) and deionized water (240 g) is added. When the temperature reaches 80° C. and the pressure zero, the stirring is stopped and the bomb opened. The contents are transferred to a three-liter, three-necked flask. To this is added toluene (306 g), water (219 g) and n-butanol (67 g). The reaction mixture is maintained at 55° C. while formic acid (219.7 g, 90%) is added over a 15-minute period. Stirring is maintained for an additional 20 minutes and the phases are separated. To the organic phase, in a three-liter flask, are added water (905 g), butyl Cellosolve (164 g) and DMAE (210 g). This mixture is heated to reflux to remove the organic distillate. The reaction mixture is cooled to 95° C. and treated with additional DMAE (100 g). Stirring is continued for 20 minutes as the solution is cooled to 60° C. The product has the following characteristics clear and essentially colorless (APHA <100) at 48% solids content; pH 9.3 ; acid number 115, (100% solids).

EXAMPLES B3 and B4

Employing the procedures similar to Step B of Example B1, the oligomeric methyl methacrylate/butyl methacrylate copolymer of Example B1, Step A, is hydrolyzed to result in 7% methacrylic acid units in the copolymer, Example B3, and 15% methacrylic acid units in the copolymer, Example B4.

EXAMPLE B5

Following substantially the same procedure as described in Example B1, an equal weight copolymer of methyl methacrylate and butyl methacrylate is prepared having a weight average molecular weight of 1100, a number average molecular weight of 950, thus, a heterogeneity index of 1.16. The copolymer is hydrolyzed to produce 54% methacrylic acid units in the product.

EXAMPLES B6 and B7

Following substantially the same procedure as described in Example B2, an oligomeric homopolymer of methyl methacrylate is prepared having a weight average molecular weight of 1100 and a heterogeneity index of 1.2. One portion of the oligomer is hydrolyzed to result in 27% methacrylic acid units, Example B6, and another is hydrolyzed to 36% methacrylic acid units, Example B7.

EXAMPLE B8

Following substantially the same procedure as described in Example B2, an oligomeric homopolymer of butyl methacrylate is prepared having a weight average molecular weight of 1110 and a heterogeneity index of 1.16. It is then hydrolyzed to give a product with 34% methacrylic acid units.

EXAMPLE B9

A Free Radical Initiated Oligomer

To a three-liter, three-necked flask (kettle) equipped with a condenser, stirrer, thermometer, addition funnel, and Y-tube is added, under nitrogen, butyl Cellosolve (341.8 g) and t-butyl peracetate, 75% in mineral spirits, (4.7 g). To this kettle charge is added, over a 6-hour period, a gradual addition initiator and, in a separate stream, a monomer mixture while maintaining the kettle temperature in the range of 145°–149° C. The gradual addition initiator consists of t-butyl peracetate, 75% in mineral spirits, (88.8 g) and butyl Cellosolve (1.2 g). The monomer mixture consists of:

|  | Grams |
| --- | --- |
| n-Butyl methacrylate | 280 |
| Methyl methacrylate | 770 |
| Methacrylic acid | 350 |
| 2-Hydroxyethyl mercaptan | 21 |

At the end of the polymerization, residual monomer is minimized by the use of a chaser catalyst. Butyl Cellosolve (510 g) is added to drop the solids to a calculated 65 weight percent; solids found is 66%. The final viscosity of the system is found to be above 100,000 centipoise at 25° C. The weight average molecular weight is approximately 2,000, and the heterogeneity index is about 2.8.

EXAMPLE B10

A Free Radical Initiated Polymer

The process and equipment employed are similar to those used in Example B9. The polymerization is conducted over a 3-hour period with the temperature maintained in the range of 140°–150° C. The kettle charge is butyl Cellosolve (341.8 g), the initiator stream is t-butyl peracetate, 75% in mineral spirits, (65.4 g). The monomer stream consists of:

|  | Grams |
| --- | --- |
| n-Butyl acrylate | 439.6 |
| n-Butyl methacrylate | 103.6 |
| Methyl methacrylate | 506.8 |
| Styrene | 88.2 |
| Methacrylic acid | 261.8 |

At the end of the 3-hour polymerization, a chaser is used to decrease the amount of unreacted monomer. Butyl Cellosolve (240 g) is added. The final solids is 71.8 weight percent; the viscosity is greater than 10,000 centipoise at 25° C. The weight average molecular weight is approximately 25,000, and the heterogeneity index is about 2.5.

EXAMPLE B11

The process and equipment employed are similar to those used in Example B9. The polymerization is conducted over a 6-hour period with the temperature maintained in the range of 146°–154° C. The kettle charge is butyl Cellosolve (415 g) and 2-hydroxyethyl mercaptan (10 g). The initiator stream is t-butyl peracetate, 75% in mineral spirits, (53.3 g). The monomer stream consists of:

|  | Grams |
| --- | --- |
| n-Butyl methacrylate | 230 |
| Methyl methacrylate | 520 |
| Methacrylic acid | 250 |

At the end of the 6-hour polymerization, a chaser is used to decrease the amount of unreacted monomer. The solids is 71 weight percent, calculated and found, $\overline{M}_w$ is 8420, $\overline{M}_n$ is 3140 and heterogeneity index is 2.7. Dimethylaminoethanol (259.4 g) is added to neutralize the acid, reducing the solids to 60%. Water is added, reducing the solids to 50% by weight and the viscosity to 20,000 centipoise at 25° C.

EXAMPLE B12

Ethoxylation of Hydrolyzed Oligomer

The following ingredients are added to an autoclave:
a. The hydrolyzed product of Example B5 (450 g), having 6.27 milliequivalents of carboxylate per gram of solids, is dissolved in 90 parts toluene and 10 parts isobutanol to give a 55.6 weight percent solution.
b. Ethylene oxide (81.8 g)
c. Tetrapropyl ammonium bromide (1.25 g)
d. Toluene (50 g).

The ingredients are stirred and heated in the autoclave for four hours at 100° C., during which time the gauge pressure decreases from 30 psi to 5 psi. After cooling, the product is removed from the autoclave which is rinsed with acetone, the rinsings being added to the product. In another vessel, the product is stripped at 90° C. and 10 mm Hg pressure for two hours to yield 525 g of product having 1.05 milliequivalents of carboxylate per gram of solids and a hydroxyl number of 215 (corresponding to 50% hydroxyethyl methacrylate in the polymer). This product is dissolved in water and DMAE at a pH of 9.0 to yield a final product having:
  73.3% solids
  9.0 pH
  3300 cps. viscosity
  1220 weight average molecular weight
  980 number average molecular weight
  1.24 heterogeneity index

EXAMPLE B13

The process and equipment employed are similar to those used in Example B9. The polymerization is conducted over a 6-hour period with the temperature maintained in the range of 146°–154° C. The kettle charge is butyl Cellosolve (415 g) and 2-hydroxyethyl mercaptan (30 g). The initiator stream is t-butyl peracetate, 75% in mineral spirits, (53.4 g). The monomer stream consists of:

| | Grams |
|---|---|
| n-Butyl methacrylate | 230 |
| Methyl methacrylate | 520 |
| Methacrylic acid | 250 |

At the end of the 6-hour polymerization, a chaser is used to decrease the amount of unreacted monomer. The final solids is 71.4 weight percent, calculated and found, $\overline{M}_w$ is 5310, $\overline{M}_n$ is 1950 and heterogeneity index is 2.6. Dimethylaminoethanol (259.4 g) is added to neutralize the acid, reducing the solids to 61%. Water is added, reducing the solids to 50% by weight and the viscosity to 10,000 centipoise at 25° C.

EXAMPLE B14

The process and equipment employed are similar to those used in Example B9. The polymerization is conducted over a 6-hour period with the temperature maintained in the range of 146°-154° C. The kettle charge is butyl Cellosolve (415 g) and 2-hydroxyethyl mercaptan (60 g). The initiator stream is t-butyl peracetate, 75% in mineral spirits, (80 g). The monomer stream consists of:

| | Grams |
|---|---|
| n-Butyl methacrylate | 230 |
| Methyl methacrylate | 520 |
| Methacrylic acid | 250 |

At the end of the 6-hour polymerization, a chaser is used to decrease the amount of unreacted monomer. The final solids is 69 weight percent found, 72% calculated, $\overline{M}_w$ is 3650, $\overline{M}_n$ is 1290 and heterogeneity index is 2.8. Dimethylaminoethanol (249 g) is added to neutralize the acid, reducing the solids to 60.9%. Water is added, reducing the solids to 50% and the viscosity to 4900 centipoise at 25° C.

EXAMPLE C1

Selection of Stable Compatible Systems

A series of preliminary tests is performed on equal weight blends of the oligomeric polymer and the high molecular polymer at 28% total solids in an aqueous solution adjusted to a pH of 9.5 with dimethylaminoethanol. The tests are:

Stability: The blend is held at 140° F. for seven days. Partial or complete gelation of the sample or visible phase separation indicates instability.

Solution Compatibility: The blend is observed for clarity upon mixing and after aging at room temperature for 14 days. Phase separation, opacity or haziness sufficient to make newspaper type illegible when read through a two-centimeter depth of blend indicates lack of compatibility.

Film Compatibility: The blend is cast on a metallic substrate to form a 1.5 mil dry film which is baked at 250° F. for 30 minutes. Haze or lack of clarity indicates lack of compatibility.

Results of these tests, as applied to several of the polymers in the A and B series of examples, are given in the following table.

| Colloidal Solution Polymer | Oligomer | | Stability | Solution Compatibility | Film Compatibility | Acceptable |
|---|---|---|---|---|---|---|
| Example A5 | Example | B8 | good | clear | clear | yes |
| " | " | B5 | good | hazy | clear | no |
| " | " | B12 | good | slight haze | clear | yes |
| " | " | B7 | good | hazy | clear | no |
| Example A4 | Example | B8 | gels | — | — | no |
| " | " | B5 | gels | — | — | no |
| " | " | B12 | good | slight haze | clear | yes |
| " | " | B7 | gels | — | — | no |
| Example A3 | Example | B8 | good | clear | clear | yes |
| " | " | B5 | gels | — | — | no |
| " | " | B12 | good | clear | clear | yes |
| " | " | B1 | good | clear | clear | yes |
| " | " | B7 | gels | — | — | no |
| " | " | B6 | separates | — | — | no |
| " | " | B2 | separates | — | — | no |
| Example A2 | Example | B8 | good | opaque | clear | no |
| " | " | B5 | gels | — | — | no |
| " | " | B12 | gels | — | — | no |
| " | " | B7 | gels | — | — | no |

The components of acceptable blends are formulated into clear and pigmented coatings as in Examples C2 – C5. The coatings transfer and flow well when applied by direct roll coating. Likewise, the coatings are also useful for application by less demanding processes such as reverse roll coating, spraying, brushing, flow coating and others well-known to those skilled in coating.

EXAMPLE C2

Lubricant Coating

The materials are handled in open metal beakers of suitable capacity using a propeller blade laboratory mixer or similar apparatus to insure uniform blending and mixing of the constituents. Ingredients are generally added to the vortex, produced in the liquid by the mixer, in the order recited.

To 1500 g of high molecular weight component (A), the polymer of Example A3, at 36% solids is added 1150 g of water and 50 g of dimethylaminoethanol, producing a 20% solids, solubilized system with a pH of about 9.0. After sufficient agitation to produce uniformity, 2500 g of this solubilized system is transferred to another vessel and 1560 g of the partially hydrolyzed oligomer of Example B1 at 46% solids is added, followed by 60 g of 2-butoxyethanol, 100 g of n-butanol and 520 g of water. The product is a lubricant coating with about 26% solids, a pH about 9.5 and a viscosity of 80 centipoise (ca. 30 seconds in a number 4 Ford cup) at 25° C. This coating, with solids adjustment if needed, is also suitable for use as a lacquer for metals, plastics, wood and other substrates.

EXAMPLE C3

Lubricant Coating

The coating is prepared as in Example C2 with the partially hydrolyzed oligomer prepared as in Example B1 except that the final solubilization of the oligomer is performed using aqueous ammonia (28% aqua ammonia) in place of the dimethylaminoethanol. The lubricant coating produced has about 26% solids, a pH about 9.6 and a viscosity of 75 centipoise (ca. 29 seconds in a number 4 Ford cup) at 25° C.

Similarly, other compatible blends of high molecular weight components, the Example A series, and oligomer components, the Example B series, are used to formulate lubricant coatings. Those skilled in the art make minor adjustments, particularly in the amounts of water, amine and solvent, to obtain solids, pH and viscosity values, in adapting the formulation to given application conditions, such as temperature, type of coater, substrate and line speed.

EXAMPLE C4

Thermoplastic Lacquer

A paste is made of 600 parts of a pigment grade titanium dioxide (Ti-Pure R-902 - DuPont), and a blend of 290 parts of the solubilized polymer of Example A1 and 110 parts of the oligomer of Example B6, the blend diluted with water to 26% solids. This paste is ground on a three-roll mill until the pigment is dispersed to a reading of about 8 on a Hegman gauge; usually, two or three passes on the mill is required. The paste is let down with 3450 parts of a blend of the Example A1 polymer and Example B6 oligomer in the same ratio as above and also adjusted to 26% solids by addition of water. The lacquer produced has a pigment to binder ratio of 40:60, on a solids basis, a total solids content of about 34%, and a pH about 9.3. This lacquer is used for a wide variety of decorative coatings on various substrates such as metal, plastics and wood. Further reduction with water is often required; for application by spraying reduction is to a viscosity of 25 seconds in a number 4 Ford cup, for roller coating reduction is to a viscosity of 60 seconds in the same cup, and for dip coating reduction is to 30 seconds in the same cup.

EXAMPLE C5

Sanding Sealer for Wood

A binder blend consisting of 30%, by weight of polymer solids, of the high polymer of Example A4 solubilized with 2-ethylhexanol and 70%, by weight of polymer solids, of the oligomer of Example B3 is reduced to 26% solids with water. A Cowles Dissolver (Cowles Dissolver Co.) running at low speed is charged with:

| | | |
|---|---|---|
| 100 parts | water | |
| 100 parts | the binder blend at 26% solids | |
| 3.0 parts | Foamaster TCX (Diamond Shamrock Corporation) | |
| 193 parts | Barytes - 30 micron $BaSO_4$ | |
| 290 parts | Duramite - 10 micron $CaCO_3$ (Thompson Weinman Co.) | |

The speed is increased to effect grinding and is maintained for about 15 minutes to produce a good grind. Under slower stirring, the sealer is let down with 610 parts of the binder blend at 26% solids. The product has a pH of about 9.0 and is optionally further reduced with water to a 40-second number 4 Ford cup viscosity. It is applied to raw wood as a sanding sealer.

EXAMPLE C6

Comparison with Commercial Lubricant Coating

The equipment used was the same as that in Example C2 and the general procedures are similar. With suitable agitation, a premix is made consisting of 450 parts of the oligomer of Example B1 at 40 percent solids, 15 parts of n-butanol, 15 parts 2-butoxyethanol and 120 parts of water. In a separate vessel, the polymer of Example A3 at 36 percent total solids is reduced to 20 percent solids with an 80-20 mixture of water and isopropanol; the pH is adjusted to 9.0 with dimethylaminoethanol. 600 parts of the polymer of Example A3, now at 20 percent solids, is added with stirring to the above premix to give a lubricant coating with a pH of 9.7 and a viscosity of 185 centipoise. This coating formulation is stable, as indicated by the pH remaining at 9.7 and the viscosity being only 200 centipoise after the formulation is stored for 100 hours at 140° F. in an accelerated test. On a solids basis, this formulation is 60 parts of the oligomer of Example B1 and 40 parts of the polymer of Example A3.

Following essentially the same procedure, a second formulation is made in which the solids is 50 parts of the oligomer of Example B1 and 50 parts of the polymer of Example A3. A third formulation has the composition: 10 parts of the oligomer of Example B1, 85 parts of the polymer of Example A2 and 5 parts of the polymer of Example A3 as weight percent solids. Approximately 0.2 mils. (when dry) films of each of these formulations was cast on cold rolled steel by means of a number 6 wire round rod. Another panel was coated with a commercial lubricant to a similar thickness. The panels were then subjected to standard tests and yielded the results given in the following table:

| COMPOSITIONS BASED ON A AND B EXAMPLES vs. COMMERCIAL RESIN | | | | |
|---|---|---|---|---|
| COMPOSITION | B1/A3 50/50 | B1/A3 60/40 | B1/A2/A3 10/85/5 | COMMERCIAL LUBRICANT (CL) |
| Flash Rusting Removability | None | None | None | None |
| Air Dried Dried | Dissolves | Dissolves | Strips then Dissolves | Dissolves |
| 5' at 160° F. | Dissolves | Dissolves | Strips as a Sheet | Dissolves |
| Fabrication | No scoring of metal | No scoring of metal | No scoring of metal | Moderate scoring |
| Blocking | Fair to Good | Good; Slightly poorer than CL | Very good; Similar to CL | Very good |
| Humidity Resistance | Good | Good, only slightly poorer than CL | Good | Good |
| Supplied Solids % | 25 | 25 | 25 | |

-continued

COMPOSITIONS BASED ON A AND B EXAMPLES vs. COMMERCIAL RESIN

| COMPOSITION | B1/A3 50/50 | B1/A3 60/40 | B1/A2/A3 10/85/5 | COMMERCIAL LUBRICANT (CL) |
|---|---|---|---|---|
| Stability (140° F/ 100 hours) | OK | OK | OK | OK |

The tests used are described as follows:

1. Flash Rusting

The panel is observed while the coating is drying and, immediately thereafter, for the appearance of discoloration typical of rusting.

2. Removability

The panel is either air-dried or force-dried as noted, and then it is immersed in a 1 percent sodium metasilicate solution for thirty seconds at 140° F. Solution or stripping of the coating is observed.

3. Fabrication

The coated metal is formed in an Erichsen deep draw test machine (manufactured by Erichsen Company, Hemer-Sundwig, West Germany); the coating is then removed and the metal is observed for scoring.

4. Blocking

After drying, the panels are tested for face to face and face to back blocking after being subjected to one hour at 130° F. under a force of 30 psi. Both the degree of sticking and the degree of marring are judged.

5. Humidity Resistance

After the panels have air-dried for 24 hours, they are exposed to an atmosphere of 100 percent relative humidity at 100° F. The degree of rusting is noted in readings taken for the first 100 hours.

It is seen that the formulations of this invention outperform the commercial lubricant in the fabrication test and, in some cases, are not quite as good in the blocking test. In removability, in general, it is desirable that the coating dissolve as do the commercial lubricant and two of the three formulations of this invention. However, in some situations, it is preferable that the coating be strippable as a sheet, the type of performance exhibited by the third formulation in the table.

In further studies of the ratio of the experimental B1 to experimental A3 component systems, it was found that increasing the B1 concentration from that in these examples gradually produced a lowering in the humidity resistance and fabrication properties. An increase in the A3 content gradually produced a deficiency in the blocking performance.

EXAMPLE C7

Lubricating Coatings for Metals

Employing the same procedures as in Example 6, other coating compositions were made, coated on cold rolled steel as before and tested in comparison with a commercial resin-based lubricant coating. Illustrative of the preparation of these coatings is that of the most complicated of them, a formulation containing two of the high molecular weight copolymers and one oligomeric copolymer. The premix consists of 25 parts of the oligomer of Example B1 at 40 percent solids, 10 parts of water and 5 parts of 2-butoxyethanol. The high molecular weight component consists of 25 parts of the polymer of Example A2 at 20 percent solids solubilized to a pH of 9.3 with dimethylaminoethanol, 267 parts of Example A2 at 30 percent solids solubilized to a pH of 8.2 with DMAE and 53 parts of water. The formulations have a total solids of 25 percent, a pH of 9.1 and a viscosity of about 200 centipoise (50 to 60 seconds in the number 4 Ford cup) at 25° C.

Films of these materials and of the commercial resin-based lubricant are cast on steel and tested as in Example 6. The results are in the following table:

| EXAMPLE COMPOSITION | C7a A2 | C7b A2/B1 90/10 | C7c A2/A3 90/10 | C7d A2/B1 85/10/5 | C7e COMMERCIAL LUBRICANT |
|---|---|---|---|---|---|
| Flash Rusting | None | None | None | None | None |
| Removability[1] | Fair | Good | Good | Excellent | Good |
| Fabrication | No metal scoring | Trace of scoring | No metal scoring | No metal scoring | Moderate scoring |
| Blocking | Good | Very good | Very good[2] | Very good | Very good |
| Humidity Resistance | Poor | Good | Poor | Good | Good |
| Stability[3] | OK | OK | OK | OK | |
| Solids, % | 25 | 25 | 25 | 25 | |

[1]Coating air-dried.
[2]Excellent in face to back and good in face to face.
[3]Composition aged 100 hrs. at 140° F.

It is readily seen from the results in this table that the omission of the oligomeric copolymer from the formulation in Examples C7a and C7c has resulted in poor humidity resistance and, thus, unacceptable performance.

We claim:

1. A polymer composition for the coating of substrates, comprising an aqueous alkaline blend having a binder consisting essentially of:
   (A) an addition copolymer of (1) about 3% to about 30% by weight of an olefinically unsaturated monomer containing a carboxyl group or mixture thereof, (2) at least one ester of acrylic or methacrylic acid, and, optionally, (3) other olefinically unsaturated monomers, the total of (1), (2) and (3) being 100%, the weight average molecular weight of the copolymer being between 10,000 and 500,000 in the form of a solution or a colloidal solution in an aqueous phase;
   (B) an oligomeric addition copolymer of (1) at least one ester of acrylic or methacrylic acid, (2) about 9% to about 50% of an olefinically unsaturated monomer having at least one carboxyl group, and, optionally, (3) other olefinically unsaturated monomers, the total of (1), (2) and (3) being 100%, the weight average molecular weight of the copolymer being between 400 and 6000, the molecular weight distribution is such that the heterogeneity index is 3 or less; and is the blend, on a solids basis, (A) being from 90 to 10 percent and (B) being from 10 to 90 percent by weight.

2. The composition of claim 1 in which component (B) comprises (1) about 50% to 91% by weight, of mer units derivable from one or more monomers selected from styrene, α-methyl styrene, acrylonitrile, vinyl chloride, vinyl acetate, vinyl pyrrolidone, vinylidene chloride, and monomers of the formula:

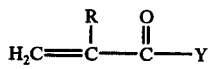

wherein R is H or methyl; and
Y is an amino, a $(C_1-C_4)$alkylamino, a di$(C_1-C_4)$alkylamino, a hydroxy$(C_1-C_4)$alkylamino, a bishydroxy$(C_1-C_4)$alkylamino, a $(C_1-C_4)$alkoxy$(C_1-C_4)$alkylamino, a bis-$(C_1-C_4)$alkoxy$(C_1-C_4)$alkylamino, or a group of the formula $-OR^4$;
wherein $R^4$ is a $(C_1-C_{24})$alkyl, a $(C_2-C_4)$alkenyl, a $(C_1-C_8)$aminoalkyl, an alkylaminoalkyl having up to 6 carbon atoms, a dialkylaminoalkyl having up to 6 carbon atoms, a group of the formula $-A^1N(R^3)CXNR^1R^2$, a $(C_2-C_8)$isocyanatoalkyl, a $(C_2-C_8)$hydroxyalkyl, a 1,3-oxazolidin-3-yl-$(C_2-C_4)$alkyl, optionally having up to two $(C_1-C_4)$alkyl substituents on the oxazolidinyl ring, an allyloxyalkyl having up to 12 carbon atoms, an alkoxyalkyl having up to 12 carbon atoms, an aryloxyalkyl or aralkyloxyalkyl having up to 12 carbon atoms, an aralkyl having up to 10 carbon atoms, an acryloyloxy$(C_1-C_4)$alkyl, a methacryloyloxy$(C_1-C_4)$alkyl, or a cyclic ureido group of the formula:

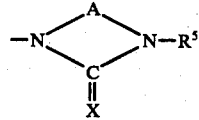

wherein $R^3$ is selected from the group consisting of H, alkyl having 1 to 4 carbon atoms, hydroxyalkyl having 1 to 4 carbon atoms, and alkoxymethyl having 2 to 5 carbon atoms;
$A^1$ is an alkylene having 2 to 8 carbon atoms;
$R^1$, when not directly attached to $R^2$, is H, phenyl, methylbenzyl, benzyl, cyclohexyl, alkyl having 1 to 6 carbon atoms, hydroxyalkyl having 1 to 6 carbon atoms, or N-alkoxyalkyl having 2 to 6 carbon atoms;
$R^2$, when not directly attached to $R^1$, is H, phenyl, methylbenzyl, benzyl, cyclohexyl, or alkyl having 1 to 6 carbon atoms;
$R^1$ and $R^2$, when directly connected together, is the morpholino residue $-C_2H_4OC_2H_4-$, the piperidino residue $-(CH_2)_5-$, or the pyrrolidino residue $-(CH_2)_4-$;
X is selected from the group consisting of oxygen and sulfur;
A is an alkylene having 2 to 3 carbon atoms; and
$R^5$ is selected from the group consisting of H, $-CH_2OH$ and $-CH_2OCH_3$;
and (2) 9% to about 50% of carboxylic acid mer units derivable from the monomers acrylic acid, methacrylic acid or itaconic acid, and the blend having a volatile aqueous phase comprising 70 to 95 percent by volume of water and 5 to 30 percent by volume of volatile organic solvents, the composition having between 15 and 70 percent solids by weight, a pH between 8.0 and 9.8, and a viscosity between 25 and 150 seconds measured in a number 4 Ford cup at 25° C.

3. The composition of claim 1 in which component (B) has a heterogeneity index less than 1.5 and a weight average molecular weight between 500 and 2500.

4. The composition of claim 2 in which component (B) is a copolymer of monomers which are esters or amides of acrylic acid or methacrylic acid, or mixtures of these with each other or with other olefinically unsaturated monomers.

5. The composition of claim 2 in which R is methyl and $R^4$ is a $(C_1-C_8)$alkyl.

6. The composition of claim 2 in which component (B) is an alkoxide polymerized polymer or copolymer, at least about 80% by weight of the polymer consists of molecules having chain lengths of about $\bar{n}/3$ to about $3.3\bar{n}$ mers, where $\bar{n}$ represents the average number of mers in the polymer chain.

7. The composition of claim 6 in which $R^4$ is a $(C_1-C_8)$ alkyl.

8. The composition of claim 6 in which the alkoxide polymerized polymer or copolymer is a hydrolysis product of a polymer or copolymer comprising mers having the structure:

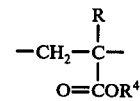

wherein R is H or methyl, and $R^4$ is a $(C_1-C_8)$alkyl.

9. The composition of claim 1 in which said olefinically unsaturated monomer containing a carboxyl group of component (A) is acrylic acid, methacrylic acid or itaconic acid.

10. The composition of claim 9 in which the ester of acrylic or methacrylic acid or a mixture thereof of component (A) may be represented by

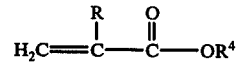

wherein R is H or methyl and $R^4$ is a group selected from a $(C_1-C_{24})$alkyl, a $(C_2-C_4)$alkenyl, a $(C_1-C_8)$aminoalkyl, an alkylaminoalkyl having up to 6 carbon atoms, a dialkylaminoalkyl having up to 6 carbon atoms, a group of the formula $-A^1N(R^3)CXNR^1R^2$;
wherein $R^3$ is selected from the group consisting of H, alkyl having 1 to 4 carbon atoms, hydroxyalkyl having 1 to 4 carbon atoms; and alkoxymethyl having 2 to 5 carbon atoms;
$A^1$ is an alkylene having 2 to 8 carbon atoms;
$R^1$, when not directly attached to $R^2$, is H, phenyl, methylbenzyl, benzyl, cyclohexyl, alkyl having 1 to 6 carbon atoms, hydroxyalkyl having 1 to 6 carbon atoms, or N-alkoxyalkyl having 2 to 6 carbon atoms;
$R^2$, when not directly attached to $R^1$, is H, phenyl, methylbenzyl, benzyl, cyclohexyl, or alkyl having 1 to 6 carbon atoms;
$R^1$ and $R^2$, when directly connected together, is the morpholino residue $-C_2H_4OC_2H_4-$, the piperidino residue $-(CH_2)_5-$, or the pyrrolidino residue $-(CH_2)_4-$; and
X is selected from the group consisting of oxygen and sulfur, a (C₂-C₈)isocyanatoalkyl, a (C₂-C₈)hydroxyalkyl, a 1,3-oxazolidin-3-yl-(C₂-C₄)alkyl, optionally having up to two (C₁-C₄)alkyl substituents on the oxazolidinyl ring, an allyloxyalkyl having up to 12 carbon atoms, an alkoxyalkyl having up to 12 carbon atoms, an aryloxyalkyl or aralkyloxyalkyl having up to 12 carbon atoms, an aralkyl having up to 10 carbon atoms, an acryloyloxy(C₁-C₄)alkyl, a methacryloyloxy(C₁-C₄)alkyl, and a cyclic ureido group of the formula:

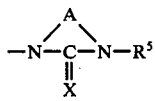

wherein A is an alkylene having 2 to 3 carbon atoms;

R⁵ is selected from the group consisting of H, —CH₂OH and —CH₂OCH₃; and

X is selected from the group consisting of oxygen and sulfur.

11. The composition of claim 10 in which said ester is a (C₁-C₁₂) acrylate or methacrylate.

12. The composition of claim 11 in which said ester is a (C₁-C₄) acrylate or methacrylate.

13. The composition of claim 9 wherein said other olefinically unsaturated monomers of component (A) are selected from the group styrene, α-methyl styrene, acrylonitrile, vinyl chloride, vinyl acetate, vinyl pyrrolidone, vinylidene chloride and those of the formula:

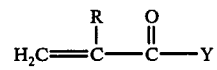

wherein R is H or methyl; and

Y is an amino, a (C₁-C₄)alkylamino, a di(C₁-C₄)alkylamino, a hydroxy(C₁-C₄)alkylamino, a bis-hydroxy(C₁-C₄)alkylamino, a (C₁-C₄)alkoxy(C₁-C₄)alkylamino, or a bis-(C₁-C₄)alkoxy(C₁-C₄)alkylamino.

14. A pigmented or unpigmented composition adapted for direct roller coating of substrates comprising a stable aqueous alkaline blend having a binder consisting essentially of:

(A) an addition copolymer of (1) about 20% to about 50% by weight of styrene, methyl methacrylate or both, about 40% to about 60% butyl acrylate and about 10% to about 20% methacrylic acid, the weight average molecular weight of the copolymer being between 20,000 and 75,000;

(B) a partially hydrolyzed alkoxide polymerized addition copolymer of methyl methacrylate and butyl methacrylate with an acid number being between 100 and 200, the weight average molecular weight being between 500 and 2500, the molecular weight distribution is such that the heterogeneity index is 1.5 or less; and in the blend, on a solids basis, (A) being from 70 to 20 percent and (B) being from 30 to 80 percent by weight, and the blend having a volatile aqueous phase comprising 70 to 95 percent by volume of water and 5 to 30 percent by volume of volatile organic solvents, the composition having between 15 and 70 percent solids by weight, with a viscosity between 25 and 150 seconds measured in a number 4 Ford cup at 25° C., and a pH between 8.7 and 9.5.

* * * * *

UNITED STATES PATENT AND TRADEMARK OFFICE
CERTIFICATE OF CORRECTION

PATENT NO. : 4,087,397
DATED : May 2, 1979
INVENTOR(S) : Richard Martorano and William H. Brandley, Jr.

It is certified that error appears in the above-identified patent and that said Letters Patent are hereby corrected as shown below:

Col. 9, line 9 - phrase "hydroxy ($C_1$-$C_4$)" should read -- hydroxy ($C_1$-$C_4$) --.

Col. 11, line 25 - phrase "viscosity of" should read -- viscosity and --.

Col. 14, line 65 - figure "(335 g)" should read -- (355 g) --.

Col. 15, line 47 - phrase "using in" should read -- used in --.

Col. 25, line 1 - phrase "is the blend" should read -- in the blend --.

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*